United States Patent [19]

Bulgrien et al.

[11] Patent Number: 5,596,153

[45] Date of Patent: Jan. 21, 1997

[54] MEASUREMENT OF ROTATIONAL VELOCITY AND TORQUE

[75] Inventors: Garth H. Bulgrien, Ephrata, Pa.; Enrico Sedoni, Modena, Italy; Carlo Sedoni, Modena, Italy; Andrea Gonano, Modena, Italy

[73] Assignee: New Holland North America, Inc., New Holland, Pa.

[21] Appl. No.: 433,539

[22] Filed: May 2, 1995

[51] Int. Cl.$^6$ ..................................................... G01L 3/00
[52] U.S. Cl. ................... 73/862.326; 73/862.191
[58] Field of Search ..................... 73/862.28, 862.321, 73/862.324, 862.325, 862.326, 862.328, 862.329

[56] References Cited

U.S. PATENT DOCUMENTS

| | | | |
|---|---|---|---|
| 4,169,371 | 10/1979 | Witschi et al. | 73/116 |
| 4,513,626 | 4/1985 | Obayashi et al. | 73/862.328 |
| 4,513,628 | 4/1985 | Kohama et al. | 73/862.328 |
| 4,520,681 | 6/1985 | Moore et al. | 73/862.28 |
| 4,683,746 | 8/1987 | Cullingford et al. | 73/862.329 |
| 4,691,288 | 9/1987 | Kay et al. | 364/511 |
| 5,031,455 | 7/1991 | Cline | 73/862.28 |

*Primary Examiner*—Richard Chilcot
*Assistant Examiner*—Ronald Biegel
*Attorney, Agent, or Firm*—Griffin, Butler Whisenhunt & Kurtossy

[57] ABSTRACT

An engine delivers torque to a transmission drive shaft through a flywheel and a damper. The damper includes a drive plate attached to the flywheel which is in turn mounted on the engine crankshaft. The damper has two driven plates which are fixed on the transmission drive shaft. The drive plate and driven plates have openings for retaining springs through which torque is transmitted from the drive plate to the driven plates. The flywheel has a plurality of arcuate segments equally spaced apart around a peripheral edge to form a plurality of windows. One of the driven plates has a plurality of radially extending fingers each extending into one of the windows so that gaps exist between each finger and two adjacent arcuate segments. As torque is transmitted through the damper the springs are compressed and the fingers move in the windows. A single sensor senses the passage of the arcuate segments, gaps and fingers and generates an output signal which is analyzed by a microcomputer to produce indications of engine RPM and torque transmitted through the damper.

22 Claims, 5 Drawing Sheets

90 degrees, start of next arcuate segment
1000 Nm, 80 degrees, ratio = 60/90 = 0.88889
200 Nm, 70 degrees, ratio = 70/90 = 0.77778
0 Nm, 60 degrees, ratio = 60/90 = 0.66667
-200 Nm, 50 degrees, ratio = 50/90 = 0.55556
-1000 Nm, 40 degrees, ratio = 40/90 = 0.44444

MEASUREMENT OF ROTATIONAL VELOCITY AND TORQUE

FIELD OF THE INVENTION

The present invention relates to measurement of engine speed and torque and more particularly to apparatus for producing indications of speed and torque from the output signal of a single sensor which senses rotation of a flywheel and a damper driven by the engine.

BACKGROUND OF THE INVENTION

U.S. Pat. No. 4,169,371 discloses a method and apparatus for producing signals proportional to the rotational speed of an engine and signals proportional to the torque of the engine. A single sensor senses pulses generated by an ignition coil driven by the engine, the sensor producing first output signals proportional to engine speed. The first signals are differentiated to obtain second signals proportional to engine acceleration. The second signals are multiplied by a constant representing the moment of inertia of the engine to thereby provide an indication of engine torque. The patented device is intended for torque measurement of an unloaded engine or, at best, an engine loaded only by the power transmission system. Since torque may be measured only during engine acceleration the primary use of the device is for engine characteristic analysis or diagnostic purposes and it is not suitable for real time control in a moving vehicle.

U.S. Pat. No. 4,691,288 discloses a system, suitable for use under normal conditions such as when the vehicle is on the road, and providing indications of engine speed and torque. This system, which requires an index wheel and timing teeth on a flywheel, must have two sensors for sensing the index and the timing teeth. In this system torque is determined from average engine speed and subcyclic engine speeds.

It is conventional to provide a large mass, commonly called a flywheel, on the crankshaft of an engine, the inertia of the flywheel tending to cause more uniform velocity of the crankshaft even though the crankshaft receives power in pulses as each cylinder fires. It is also known to provide a damper between the engine and the input shaft of a power-shift transmission in an agricultural tractor, the damper tending to deflect and thus absorb the power pulses so that the torque delivered to the transmission input shaft is more constant over an engine cycle.

SUMMARY OF THE INVENTION

An object of the invention is to provide a method and apparatus for determining the torque transmitted from a rotating input shaft to an output shaft through a damper.

Another object of the present invention is to provide a method and apparatus for measuring torque delivered to the input shaft of an engine driven transmission by measuring the deflection of a damper interposed between the engine and the transmission.

Yet another object of the invention is to provide an apparatus for measuring the torque transmitted from a rotating input shaft to a rotating output shaft, the apparatus comprising: a first element affixed to the input shaft and having a peripheral surface portion comprising a plurality of arcuate segments spaced from each other to form a plurality of windows; a damper comprising a drive element affixed to the first element, a driven element affixed to the output shaft, and a plurality of resilient means disposed between the drive element and the driven element for driving the driven element in response to rotation of the drive element, the driven element having a plurality of fingers extending into the windows; and a sensor disposed adjacent the first element for sensing the passage of the arcuate segments and the fingers and producing an output signal indicative of the torque transmitted through the damper.

A further object of the invention is to provide an apparatus as described above wherein the drive element comprises a drive plate and the driven element comprises first and second driven plates disposed on opposite sides of the drive plate, the drive plate and the driven plates having a plurality of openings therein in which the resilient means are disposed, the resilient means being compressed by the drive plate and the driven plates so as to tend to align the openings in the driven plates with the openings in the drive plate.

Still another object of the invention is to provide an apparatus as described above wherein, when no torque is transmitted from the drive plate to the driven plates, each finger of the driven element is centered in one of the windows so as to form first and second gaps between each finger and arcuate segments of the first element and wherein transmission of torque from the drive plate to the driven plates compresses the resilient means and moves the fingers of the driven element in the windows so that the first and second gaps vary in width, the sensor output signal including first and second signals having durations corresponding to the widths of the first and second gaps, respectively, and microcomputer means responsive to the first and second signals for producing an indication of the torque transmitted through the damper.

In an alternative embodiment, the microcomputer means measures the interval of time elapsing between the sensing of the beginnings of two consecutive arcuate segments and the interval of time elapsing between the sensing of the beginnings of an arcuate segment and the next following finger, and from the measured intervals computes the rotational velocity of the input shaft and the average torque transmitted through the damper.

Other objects and advantages of the invention and the manner of making and using it will become obvious upon consideration of the following description and the accompanying drawings.

BRIEF DESCRIPTION OF THE DRAWINGS

FIG. 7 is a graph illustrating the torque/deflection characteristic of a damper; and, FIG. 8 is a diagram used to explain one manner in which torque may be determined after damper deflection has been measured.

DETAILED DESCRIPTION OF THE INVENTION

Figure 1:
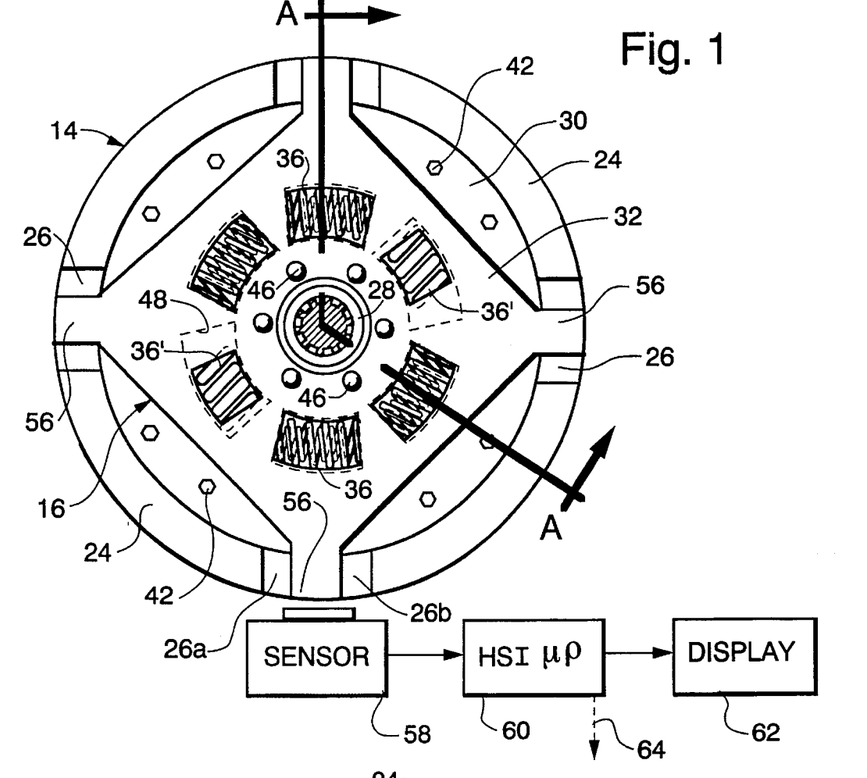
FIG. 1 is an elevation view of a flywheel and damper looking along the axis of rotation, the view also schematically showing a sensor and a microcomputer for developing indications of engine speed and torque.
Figure 2:
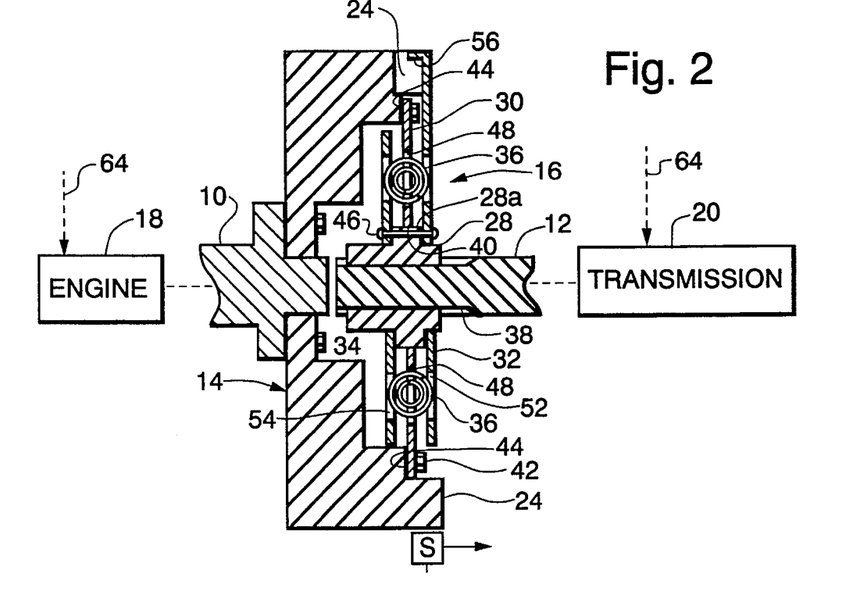
FIG. 2 schematically illustrates a flywheel and damper disposed in a drive line between an engine and a transmission, the flywheel and damper being shown in section as viewed along the line A—A of FIG. 1.

As shown in FIGS. 1 and 2, a first embodiment of an apparatus for sensing rotational velocity and torque comprises an input shaft 10, an output shaft 12 coaxial with the input shaft 10, a first member 14 and a second member 16. Typically, input shaft 10 is the crankshaft of an engine 18 and the output shaft 12 drives a vehicle transmission 20, the first member 14 being the flywheel for the engine and the second member 16 being a damper.

Flywheel 14 is mounted on and bolted to the input shaft 10 so that there is no movement of the flywheel relative to the shaft. The side of flywheel 14 facing the output shaft 12 has a generally circular peripheral surface portion comprising a plurality of arcuate segments 24 spaced from each other so as to form a plurality of windows 26. Although FIG. 1 illustrates a preferred embodiment in which the segments 24 are of equal length and the windows 26 are of equal width, the principles of the invention are equally applicable to arrangements wherein the segments are of unequal length and the windows have unequal widths.

The damper 16 comprises a hub 28, a drive element 30, a driven element comprising first and second driven plates 32, 34, and a plurality of resilient means or members which may be compression springs 36, 36'. Hub 28 is splined and mounted on the splined end portion 38 of the output shaft 12. Drive element 30 comprises a generally circular drive plate having a central opening 40 which surrounds a flange 28a on hub 28 but is free to rotate relative to the hub. The drive plate 30 is mounted to one face of the flywheel 14 by a plurality of bolts 42, the face of the flywheel having a surface 44 against which the drive plate is clamped so that the drive plate lies in a plane normal to the axis of output shaft 12.

The first and second driven plates 32, 34 are disposed on opposite sides of drive plate 30 and are riveted to opposite faces of hub flange 28a by a plurality of rivets 46. The driven plates 32, 33 are provided with a plurality of openings 52 and 54, respectively in which the compression springs 36, 36' are disposed. Openings 52 and 54 have widths somewhat less than the diameter of the springs and have a length approximately equal to the free length of the springs 36, 36'. One opening 52 and one opening 54 cooperate to retain one spring 36 or 36'. The drive plate 30 is provided with a like plurality of openings 48 which may be the same length as openings 52 and 54 or somewhat longer.

Figures 7, 8:
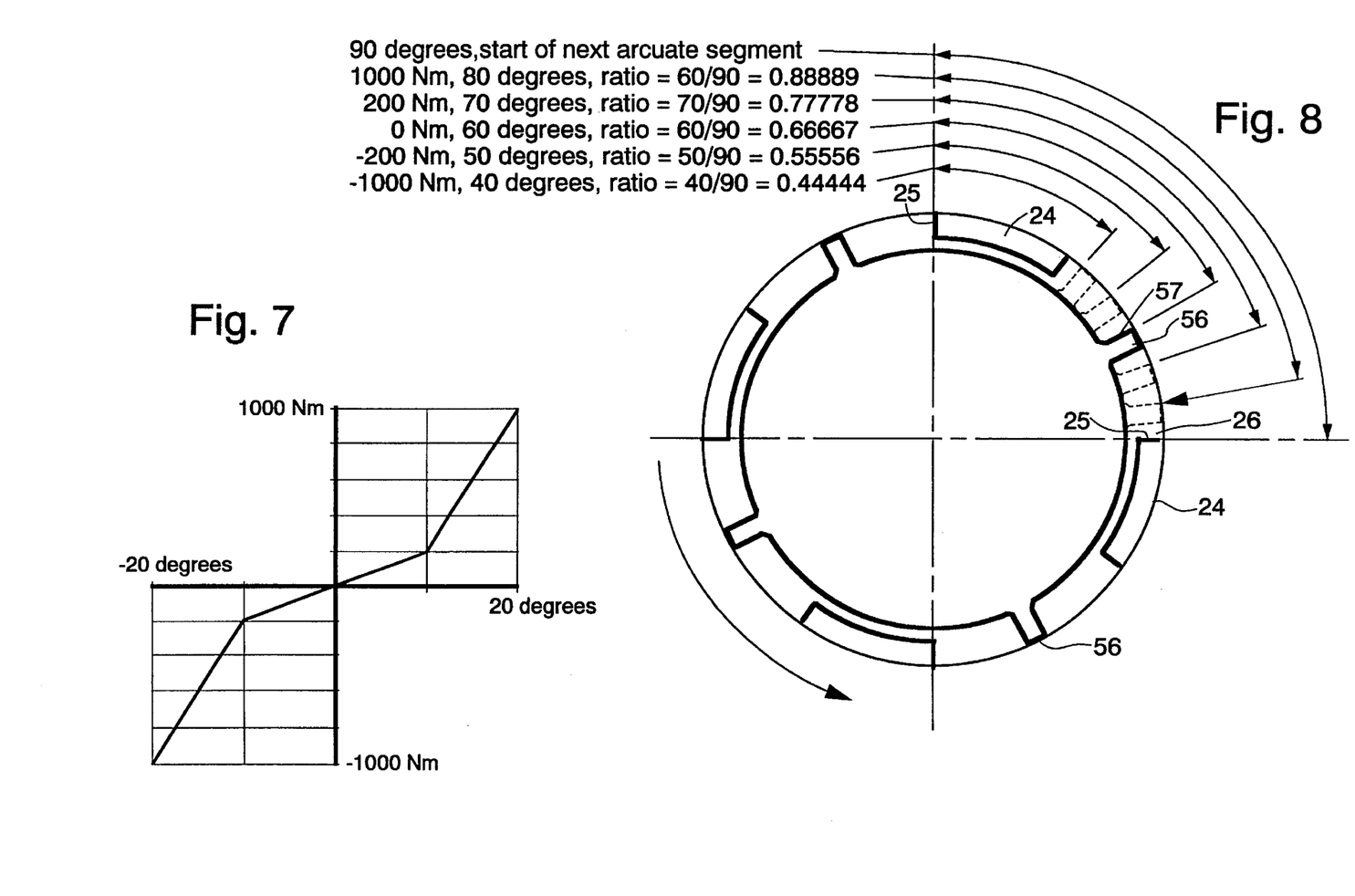

As shown in FIG. 1, the springs 36 are doubled coiled springs whereas the springs 36' are stiffer, single coil springs. The openings 48 in which springs 36' are located are longer than the springs 36' so that the damper 16 exhibits a non-linear torque-deflection characteristic as illustrated in FIG. 7. If a non-linear torque-deflection characteristic is not desired in a particular application, all of the springs 36, 36' may be alike. Furthermore, the springs may be replaced with other forms of resilient means such as hard rubber elements or even fluid piston/cylinder arrangements.

The driven plate 32 has a plurality of projecting portions or fingers 56, each finger extending radially into one of the windows 26. Windows 26 are wider than fingers 56. The springs 36, 36' align the openings 48, 52 and 54 so that fingers 56 do not contact arcuate segments 24 throughout the full range of travel of damper 16. When no torque is being transmitted through damper 16, the gaps 26a, 26b between the sides of the fingers and the arcuate segments adjacent the fingers are of known widths which preferably are, but need not necessarily be equal.

When input shaft 10 is rotated and a load is placed on output shaft 12, the springs 36, 36' are compressed as the load causes the driven plates 32, 34 to "lag" or shift rotationally relative to the flywheel 14 and drive plate 30. Assuming the flywheel is rotating clockwise as shown in FIG. 1, the lag of the driven plate 32 shifts or deflects the fingers 56 within windows 26 so that the gaps 26a become larger and the gaps 26b become smaller. The ratio of the widths of gaps 26a to 26b, or the ratio of the width of either of the gaps to the total width of a window 26 is a function of the torque being transmitted through the damper.

The purpose of the damper 16 is to deflect and absorb engine vibration. The deflection varies during rotation and at any instant in time does not necessarily represent the average torque being transmitted. However, by averaging the deflection over a single rotation of the flywheel 14, a reliable indication of average torque may be obtained. Six cylinder four-stroke engines have three power pulses per revolution so two fingers spaced 180° apart will tend to average the deflections. Four cylinder four-stroke engines deliver two power pulses per revolution so four fingers spaced 90° apart will tend to average the deflections. Spacing four fingers at 90° intervals provides two pairs of fingers spaced 180° apart so this arrangement, illustrated in FIG. 1, is satisfactory for use with either four or six cylinder engines.

A sensor 58 is provided for sensing the passage of arcuate segments 24 and fingers 56. Since the flywheel 14 and fingers 56 are made of metal, the sensor may be a reluctance proximity sensor. Preferably, the sensor is a Hall-effect device producing a square-wave type electrical output signal which is applied to a microcomputer 60.

Figure 3:
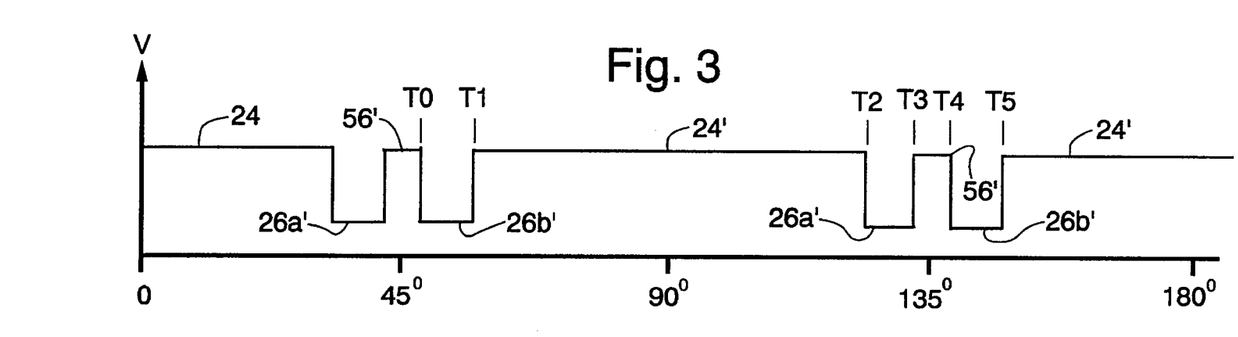
FIG. 3 illustrates the waveform of the output signal produced by the sensor plotted as a function of the angular rotation of the flywheel.

FIG. 3 illustrates the waveform of the electrical output signal produced by sensor 58 as the flywheel rotates through 180°. Each arcuate segment 24 extends over an arc of 60°, the windows 26 extend over arcs of 30° and the fingers 56 are 10° of arc in width. In FIG. 3, the high level pulses 24' of long duration are produced as sensor 58 senses passage of arcuate segments 24 of the flywheel. The high level pulses 56' of shorter duration are produced as the fingers 56 pass the sensor and the low levels 26a', 26b' represent the passage of gaps 26a and 26b past the sensors.

Microcomputer 60 calculates rotational velocity in a straightforward manner using a timer and a counter contained therein. From FIG. 3 it is seen that there are two signal transitions from the high to the low level and two signal transitions from the low to the high level during 90° of rotation of the flywheel. The counter counts transitions of one type, either high-to-low or low-to-high, and the timer measures the time required to count two transitions of the same type. Preferably, the counting should begin upon sensing a transition defining a leading edge of an arcuate segment pulse. The microcomputer divides an appropriate units conversion factor by the measured time value to obtain an indication of the rotational velocity in rpm. Plural measurements may be made during a single revolution of the flywheel and the measurements averaged to obtain an indication of the average rotational velocity.

Damper deflection or torque is determined by comparing the elapsed time between the high-to-low and low-to-high transitions occurring before a finger pulse 56' to the elapsed time between the high-to-low and low-to-high transitions occurring after the finger pulse. In other words, the durations of the low level signals 26a' and 26b' are compared. This requires that the finger pulses be distinguishable from the arcuate segment pulses. In the embodiment of FIG. 1, the finger pulses and the arcuate segment pulses are distinguishable on the basis of time duration since the length of arcuate segments 24 is considerably greater than the width of fingers 56.

Assuming a normal operating range of 600–2400 RPM the duration of the arcuate segment pulses 24' will vary in the range of about 4 to 17 ms. The width of fingers 56 is 10° of arc or ⅙ that of the arcuate segments so the finger pulses 56' will have a duration that does not exceed 3 ms. Thus, any pulse 3 longer than 3.5 ms in duration is assumed to be an arcuate segment pulse and any pulse of 3.5 ms or less is assumed to be a finger pulse.

Figures 4A, 4B:
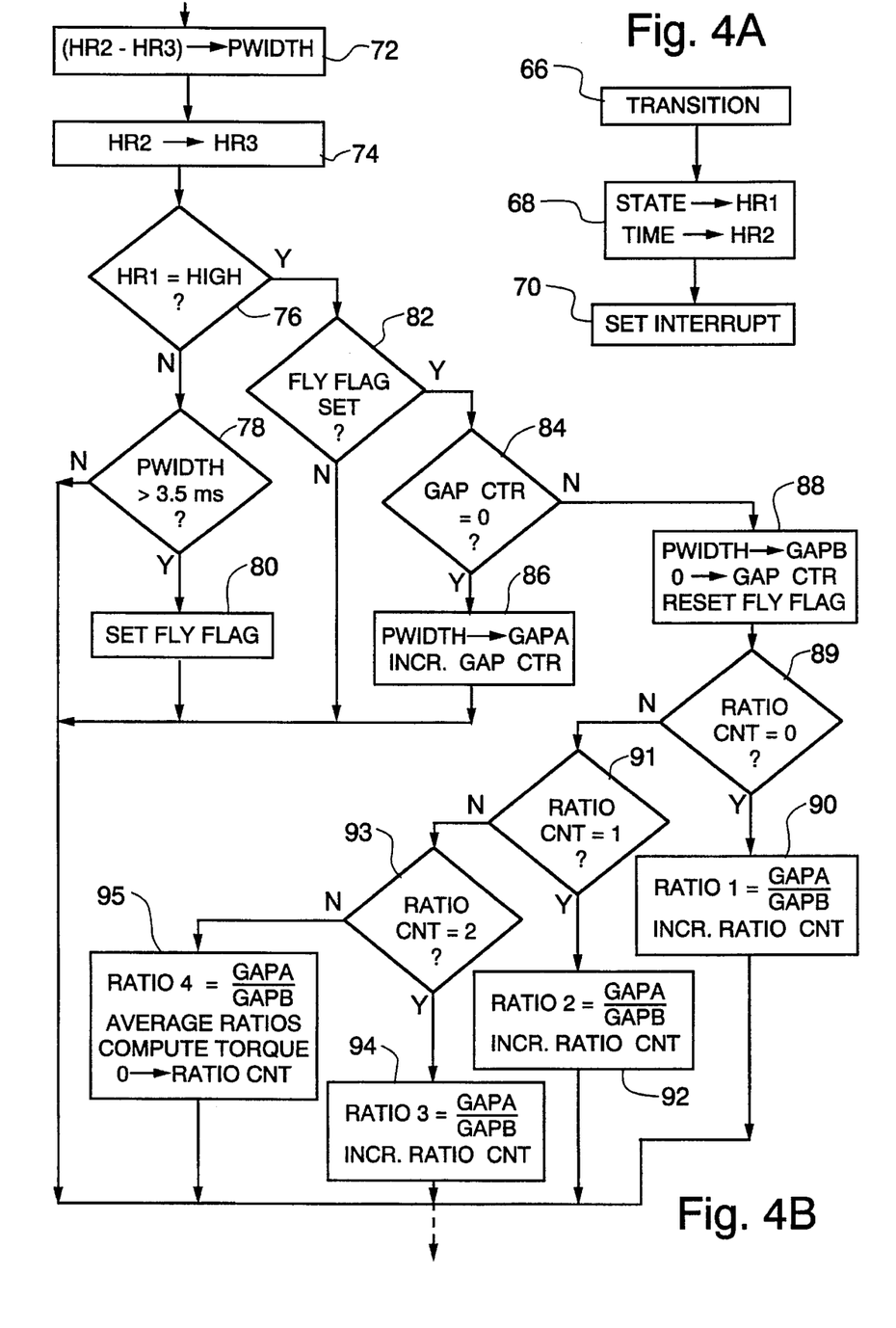
FIGS. 4A and 4B illustrate a program executed by a microcomputer to develop an indication of torque.

FIGS. 4A and 4B illustrate operations which may be performed by microcomputer 60 to compute an indication of torque in response to the output signal from sensor 58. The sensor 58 is connected to a high speed input (HS1) of the microcomputer. When a transition occurs in the sensor output signal, the transition is detected by the microcomputer (step 66, FIG. 4A). The new state or level of the signal is saved in a holding register HR1 (step 68). The microcomputer includes a timer or continuously running counter and when a transition occurs in the sensor output signal the timer value is transferred to a second holding register HR2. An interrupt flag is then set (step 70).

When the CPU in the microcomputer has attended to higher priority tasks and recognizes the interrupt, the CPU executes the routine shown in FIG. 4B. A third holding register HR3 in the CPU holds the time at which the last previous transition of the sensor output signal occurred. Assuming that the current transition is the low-to-high transition occurring at T1 (FIG. 3), HR3 will be holding the time T0. HR3 is subtracted from HR2 and the difference, that is, a value representing the elapsed interval between T0 and T1, is saved in a location PWIDTH (step 72). HR3 is then updated (step 74) so that it holds the time T1.

Step 76 tests HR1 to determine if the transition is from the low to the high state. Assuming the transition sensed is the one occurring at T1 (FIG. 3), the test at step 76 proves true and step 82 is executed to determine if a FLY flag is set. This flag is set when an arcuate segment on the flywheel has been sensed, more particularly at the time the end of an arcuate is sensed as subsequently explained. Since the FLY flag is not set when step 82 is executed, an exit is made from the routine.

When the high to low state transition occurring at T2 is sensed (step 66), a code representing the low signal state is entered into HR1 (step 68) and a value representing the time T2 is saved in HR2. Another interrupt is then set.

When the interrupt is acknowledged, the difference between times T2 and T1 is entered into PWIDTH (step 72) and HR3 is updated to the time T2 (step 74). At step 76 HR1 is tested to see if the current state of the sensor signal is high and since the signal is not high step 78 is executed to determine if the high level pulse that just ended was an arcuate segment pulse, that is, to determine if it was longer than 3.5 ms. The test proves true so the FLY flag is set at step 80 before an exit is made from the routine.

When the low to high level transition of the sensor output signal occurs at time T3, steps 68 and 70 are again executed to save the new (high) state of the signal in HR1, save the time of the transition in HR2, and set another interrupt. When the interrupt is acknowledged, step 72 enters into PWIDTH a value representing the duration of the low level gap signal 26a' occurring between T2 and T3 and step 74 updates HR3 to the time T3.

Since HR1 now holds an indication that the state of the sensor output signal is high, the test at step 76 proves true and since the FLY flag is set the test at step 82 proves true. Step 84 is executed to determine if GAP CTR contains a zero. GAP CTR is used as a control to direct the measured width of a low level signal (saved in PWIDTH) into a first register GAPA or a second register GAPB. Assuming that GAP CTR contains a count of zero, step 86 is executed to transfer the contents of PWIDTH (T3-T2) to GAPA. GAP CTR is then incremented and an exit is made from the routine.

When the state of the sensor output signal changes from high to low at T4, steps 68 and 70 are again executed. This loads in HR1 an indication that the signal state is now low, loads into HR2 an indication of the time T4, and sets another interrupt.

When the interrupt is recognized step 72 loads PWIDTH with an indication of the interval of time between T3 and T4 and step 74 updates HR3 so that it holds a value representing time T4. Since the signal state is now low, the test at step 76 proves false and step 78 is executed to determine if the high level pulse which just ended was an arcuate segment pulse. Since PWIDTH holds the difference between T3 and T4, and thus represents the width of a finger pulse, the test at step 78 proves false and an exit is made from the routine.

Upon occurrence of the low to high signal transition at time T5, steps 68 and 70 are again executed thereby loading HR1 with an indication that the signal state is high, loading HR2 with an indication of the time T5 and setting another interrupt. When the interrupt is recognized, step 72 loads PWIDTH with a value representing the duration of the low level gap signal 26b' occurring between T4 and T5. HR3 is then updated to T5 (step 74) and HR1 is tested (step 76) to determine if the signal state is now high. Since the signal state is high, the FLY flag is tested at step 82. The FLY flag is still set so the GAP CTR is tested at step 84.

Since GAP CTR contains a count of one, having been incremented when step 86 was executed, the test at step 84 proves false. At step 88 the value in PWIDTH is transferred to GAPB, GAP CTR is reset to zero, and the FLY flag is reset.

At this point the flywheel 14 has rotated through 90° and the measured widths of the low level gap pulses 26a', 26b' between T2 and T3 and T4 and T5 are stored in registers GAPA and GAPB. At step 89 a counter RATIO CNT is tested. RATIO CNT counts from 0 to 3 and is used to direct the ratio of GAPA to GAPB into one of four registers RATIO1–RATIO4. Assuming RATIO CNT contains a count of 0, the routine advances from step 89 to step 90 where the ratio of GAPA to GAPB is calculated and stored in RATIO1. RATIO CNT is then incremented and an exit is made from the routine.

During the next 90° of rotation of flywheel 14, the microcomputer repeats the operations described above to measure the widths of the next gaps 26a and 26b. When step 89 is reached the test for a zero in RATIO CNT proves false and step 91 tests RATIO CNT for a count of 1. Since RATIO CNT contains a count of 1, the ratio of GAPA to GAPB is calculated and stored in RATIO2.

It is obvious from the foregoing description that during the next 180° of rotation of flywheel 14 two more gaps 26a and two more gaps 26b may be measured with the ratio of the first gap 26a to the first gap 26b being stored in RATIO3 (step 94) and the ratio of the second gap 26a to the second gap 26b being stored in RATIO4 (step 95).

After step 95 stores RATIO4, the microcomputer takes the average of RATIO1–RATIO4 and computes an indication of average torque from the average of the ratios, and resets RATIO CNT. Computation of torque may be a direct calculation in which the average ratio is multiplied by a factor which takes into account various factors such as the modulus or spring constant of springs 36, 36'. Alternatively a table of pre-computed torques may be established in the microcomputer memory with the table being addressed using the computed average ratio of the gap widths. At this point the flywheel 14 has completed one revolution and the process described above may be repeated for the next revolution.

The average ratio may be calculated in various ways. For example the widths of gaps 26a may be summed in one accumulator and the widths of the gaps 26b summed in a second accumulator over one rotation of the flywheel 14. The average ratio is then obtained by dividing one sum by the other.

The embodiment described above works well with either four or six cylinder engines but for use with four cylinder four-stroke engines, two fingers 56 and two windows 26 may be eliminated. In the latter case, steps 91–94 may be eliminated from the routine shown in FIG. 4.

The above-described embodiment is somewhat limited in its use. For example, where engine speeds may vary from 600 to 3600 RPM, the duration of the arcuate segment pulse may vary in duration over a range which overlaps the range of duration of the finger pulses so that the arcuate segment pulses and the finger pulses are not distinguishable on the basis of time duration.

Figure 5:
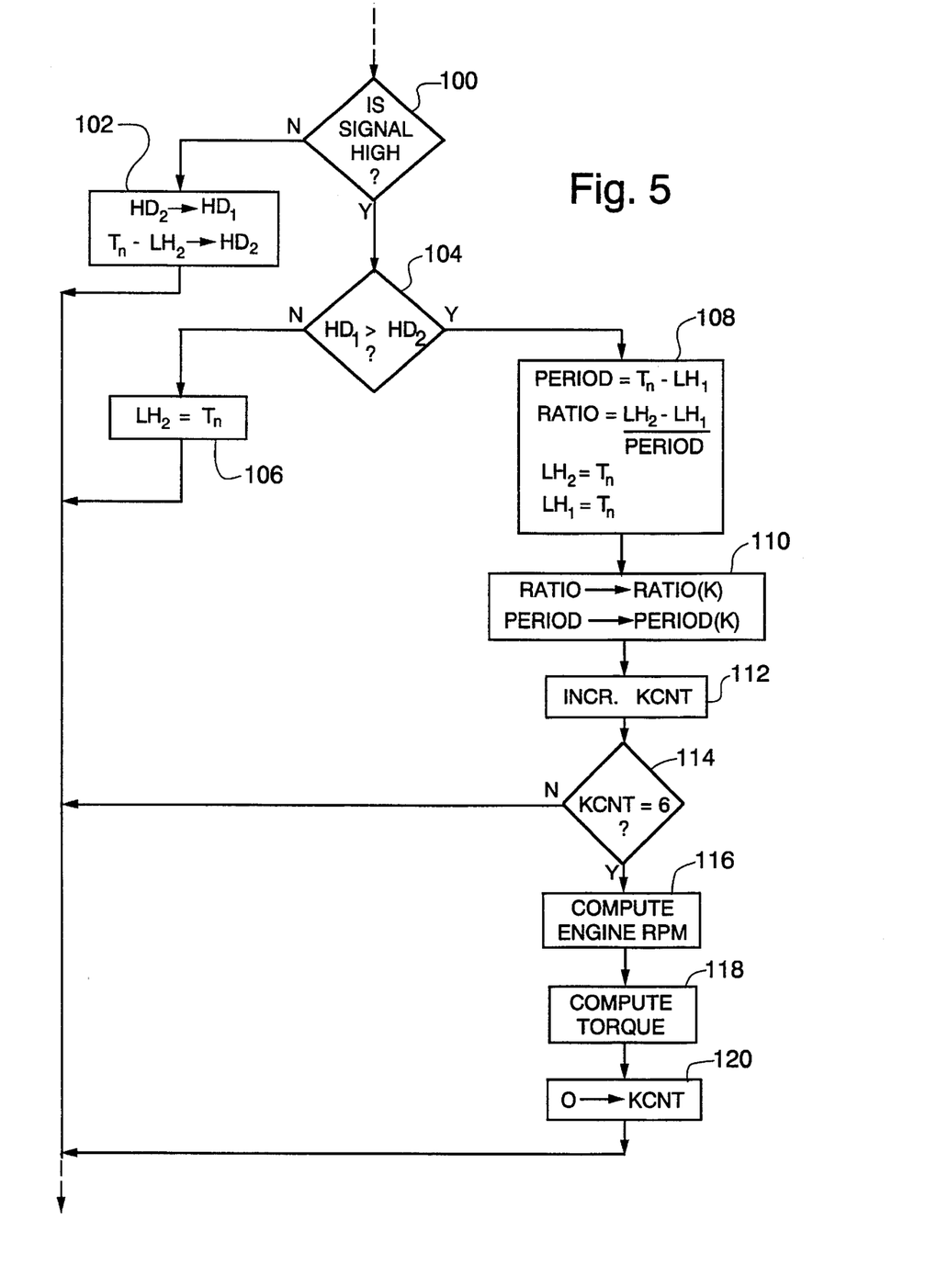
FIG. 5 illustrates a routine executed by the microcomputer to develop an indication of engine speed and torque.

The microcomputer routine illustrated in FIG. 5 permits the flywheel/damper configuration of FIG. 1 to be used with engines having higher rates of rotation of the engine output shaft. The routine also permits the use of shorter arcuate segments on the flywheel so that more windows and fingers may be provided. This in turn permits more samples to be made of the sensor output signal during a single revolution of the flywheel thus yielding a closer approximation to the average torque transferred through the damper. Alternatively, shorter arcuate segments can be used to provide larger windows, thus allowing more damper travel. In a typical embodiment, the arcuate segments 24 on the flywheel may be somewhat less than twice the width of fingers 56, and may have larger widths if desired.

Figure 6:
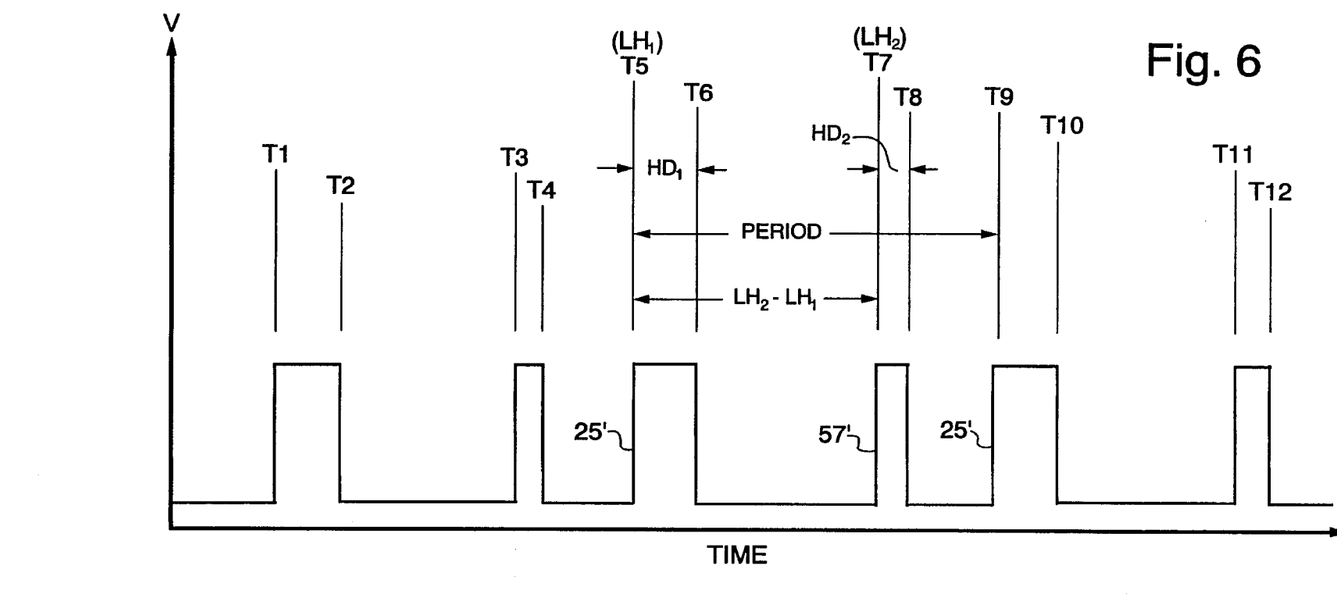
FIG. 6 illustrates the waveform of the output signal produced by the sensor plotted as a function of time.

The routine of FIG. 5 will be explained in conjunction with the sensor output waveform plotted in FIG. 6 as a function of time.

The routine of FIG. 5 is entered on an interrupt basis in the same manner as described with reference to FIG. 4. That is, the microcomputer is responsive to the output signal from sensor 58 so as to store in a timer register $T_n$ the time at which the signal changes state, store an indication of the new signal state, and generate an interrupt. When the CPU in the microcomputer recognizes the interrupt, the routine of FIG. 5 is executed beginning at step 100. For the sake of brevity, the sensing of the signal transition, the storing of the time of transition and state of the sensor output signal will not be repeated but it should be understood that these events occur prior to each entry into the routine of FIG. 5.

Step 100 tests the indication of the signal state after the last transition. If the signal level is not high, the transition was from the high to the low level. Step 102 is executed to update two registers $HD_2$ and $HD_1$ which, as subsequently explained, store indications of the durations of the last and the next to last high level signals, respectively. An exit is then made from the routine.

If step 100 determines that the signal level is high, step 104 is executed to determine if the transition represents the beginning of an arcuate segment pulse or a finger pulse. $HD_2$ is compared to $HD_1$ and if $HD_1$ is not greater than $HD_2$ it means that a finger pulse is just starting. The time of the low-to-high transition is loaded into a register $LH_2$ from $T_n$ (step 106) and an exit is made from the routine.

If step 104 determines that $HD_1$ is greater than $HD_2$ it means that an arcuate segment pulse is just starting. Step 108 is executed to calculate two values PERIOD and RATIO, and updates two registers $LH_1$ and $LH_2$. PERIOD is a value representing the time elapsing between the beginnings of two consecutive arcuate segment pulses. RATIO is that portion of a period which elapses between the beginning of the period and the beginning of the finger pulse occurring during that period. The registers $LH_1$ and $LH_2$ are loaded from the timer register $T_n$ and indicate the time of occurrence of the low-to-high transitions which signal the beginnings of an arcuate segment pulse and the next following finger pulse, respectively.

The operations represented by steps 100, 102, 104, 106 and 108 may be best understood by considering a specific example. Assume that the low-to-high transition occurring at T5 (FIG. 6) is detected. Step 100 detects that the signal level is now high and step 104 detects that $HD_1$ is greater than $HD_2$ because at T5 $HD_1$ is still holding an indication of the duration of the arcuate segment pulse occurring between times T1 and T2 and $HD_2$ is holding an indication of the duration of the finger pulse occurring between times T3 and T4. At step 108, $LH_1$ and $LH_2$ are both loaded from timer register $T_n$ with an indication of the time T5. Step 108 also computes PERIOD and RATIO but these values are for the period T1–T5.

After the signal transition occurs at T6, step 100 detects that the signal is not high so step 102 is executed to transfer $HD_2$ to $HD_1$ and load $HD_2$ with the difference between T6 and $LH_2$. Since $LH_2$ was set to T5 when step 108 was executed, $HD_2$ now holds the difference between T6 and T5 which, as shown in FIG. 6, is the duration of an arcuate segment pulse.

After signal transition occurs at T7 step 100 detects that the signal after transition is again high. Step 104 detects that $HD_1$ is not greater than $HD_2$ since $HD_2$ holds an indication of the arcuate segment pulse occurring between T5 and T6 while $HD_1$ holds an indication of the duration of the arcuate segment pulse occurring between T3 and T4. Therefore, step 106 sets $LH_2$ to the time T7 and an exit is made from the routine.

After the high-to-low transition occurs at T8, step 100 detects that the signal is not high. Step 102 transfers the value representing the duration of the last arcuate segment pulse from $HD_2$ to $HD_1$ and enters into $HD_2$ the difference between T8 and $LH_2$. Since $LH_2$ was set to time T7 when step 106 was executed, $HD_2$ is loaded with the value T8-T7 which, as shown in FIG. 6, is the duration of the finger pulse. An exit is then made from the routine.

After the low-to-high transition occurs at T9, step 100 detects that the signal is now high. Since $HD_1$ and $HD_2$ now hold representations of the durations of the last arcuate segment pulse and the last finger pulse, respectively, step 104 determines that $HD_1$ is greater than $HD_2$. Step 108 first calculates PERIOD by subtracting $LH_1$ from the current time T9. Since $LH_1$ was loaded with the time at T5, PERIOD is equal to T9-T5 or the interval elapsing between transitions occurring at the beginnings of two consecutive arcuate segment pulses.

Step 108 next calculates RATIO. $LH_1$, which holds the value of time T5, is subtracted from $LH_2$ which holds the time value T7. The difference is the interval elapsing between the transitions signalling the beginning of the arcuate segment pulse at T5 and the beginning of the next following finger pulse at T7. This difference is divided by PERIOD to obtain RATIO which represents the displacement of the leading edge a finger 56 relative to the leading edge of the preceding arcuate segment 24. In FIG. 6, 57' designates the leading edge of the finger pulse and 25' designates the leading edge of the preceding arcuate segment pulse. Step 108 then updates $LH_1$ and $LH_2$ by entering the value for time T9 therein.

Each time step 108 is executed the microcomputer computes one value of PERIOD and one value of RATIO. Since the values of PERIOD and RATIO at any instant in time may not be indications of the true period or ratio, the values are saved in memory and then averaged over an interval such as one revolution of the flywheel.

At step 110 the values of RATIO and PERIOD are saved at memory locations RATIO(K) and PERIOD(K) where K is the count in a counter KCNT having a modulus equal to the number of fingers 56, say six. KCNT is incremented at step 112 and then tested at step 114 to see if 6 values of RATIO and PERIOD have been stored. If not, an exit is made from the routine and subsequently another set of values for RATIO and PERIOD are calculated over the next period extending from T9 to T13.

After six sets of values for RATIO and PERIOD have been calculated and stored, the test at step 114 will prove true. At step 116 the engine velocity in RPM is computed by taking the average of the six values of PERIOD to obtain an average time for one period, and multiplying the reciprocal of the average by a factor which takes into account the number of fingers and conversion of units of measurement.

At step 118 an indication of the average torque transmitted through damper 16 is computed. This may be done by averaging the six values for RATIO and multiplying the resulting average by a conversion factor which is dependent on factors such as the spring constant of the springs 36, 36'.

After the torque is computed, KCNT is reset (step 120) and the system is ready to begin computations for the next rotation of the flywheel.

The conversion of RATIO into a torque value may also be accomplished using an interpolation scheme and a table of values stored in a ROM in the microcomputer. FIG. 7 shows the torque/deflection curve of a typical damper having a non-linear torque/deflection characteristic. Deflection is linear with increasing/decreasing torque up to a point where the torque is 200 Nm and the deflection is 10°. Compression of the stiffer springs $36^1$ (FIG. 1) begins at about 200 Nm and the deflection reaches 20° at a torque of 1000 Nm.

The curve of FIG. 7 is associated with a torque measuring device as shown in FIG. 8 wherein the flywheel or driving member has four arcuate segments 24 of 35 degrees length leaving four windows 26 of 55 degrees length. Four fingers 56 of 5 degrees arcuate length are disposed in the windows, the fingers being centered in the windows when no torque is being transmitted. Fingers 56 may move to within 5° of the arcuate segments at maximum torque thus the fingers have a range of movement of ±20° within the windows.

This arrangement results in a 90° arc from the leading edge 25 of one arcuate segment to the leading edge of the next arcuate segment, and a 60° arc from the leading edge 25 of an arcuate segment and the leading edge 57 of a finger. With the flywheel and damper running at a constant speed and transmitting zero torque, this results in a time ratio of 60/90 or 0.66667. As the transmitted torque is increased, the driven member lags so that the fingers 56 shift in the windows so as to increase the ratio. With negative torque the fingers 56 shift in the opposite direction so that the ratio decreases.

A table of values (Table I) is established in ROM.

TABLE I

| RATIO | TORQUE (Nm) |
|---------|-------------|
| 0.44444 | −1000 |
| 0.55556 | −200 |
| 0.66667 | 0 |
| 0.77778 | 200 |
| 0.88889 | 1000 |

After the values of RATIO have been determined using a routine like the one shown in FIG. 5, modified so that KCNT is a modulo-4 counter, the four values of RATIO derived during one revolution of the flywheel may be averaged and the averaged ratio value used to derive the average torque transmitted. Using the averaged ratio value and interpolation techniques, the average torque may be determined using Table I.

Each of the four values of RATIO derived during one revolution of the flywheel may be individually used with Table I to derive four values representing the instantaneous torque transmitted at four times in the revolution. The instantaneous values of torque thus derived may be averaged to obtain an indication of the average torque transmitted during one revolution of the flywheel.

The values of engine speed and torque may be displayed on a display 62 within view of the vehicle operator and/or the speed and torque values may be used by the microcomputer to produce control signals on leads 64 for controlling the engine 18 and/or the transmission 20.

From the foregoing description it is seen that the present invention provides a system requiring only one sensor and capable of producing indications of both engine speed and transmitted torque. While specific embodiments have been described by way of illustration, it will be understood that various modifications and substitutions may be made in the embodiments described without departing from the spirit and scope of the invention as defined by the appended claims. The number of fingers provided on the driven damper plate may vary. Since the flywheel 14 and damper drive plate 30 are fixed to each other, a single monolithically formed member may serve as both the flywheel and the drive plate. Finally, the averaging of values is not limited to averaging over the specific intervals specified for the illustrated embodiments.

I claim:

1. Apparatus for measuring the torque transmitted from a rotating input shaft to a rotating output shaft, said apparatus comprising:

a first element affixed to said input shaft and having a peripheral surface portion comprising a plurality of arcuate segments spaced from each other to form a plurality of windows;

a damper comprising a drive element affixed to said first element, a driven element affixed to said output shaft, and a resilient means disposed between said drive element and said driven element for driving said driven element in response to rotation of said drive element;

said driven element having a plurality of fingers extending into said windows; and, a sensor disposed adjacent said first element for sensing passage of said arcuate segments and said fingers and producing an output signal indicative of the torque transmitted through said damper, wherein said output shaft drives a transmission and said input shaft is driven by an engine, said first element being a flywheel for said engine.

2. Apparatus as claimed in claim 1 wherein said drive element comprises a drive plate and said driven element comprises first and second driven plates disposed on opposite sides of said drive plate, said drive plate and said driven plates having a plurality of openings therein in which said resilient means are disposed, said resilient means being compressed by said drive plate and said driven plates so as to tend to align the openings in said driven plates with the openings in said drive plate.

3. Apparatus as claimed in claim 2 wherein, when no torque is transmitted from said drive plate to said driven plates, each said finger of said driven element is centered in one of said windows so as to form first and second gaps of equal width between each finger and arcuate segments of said first element.

4. Apparatus as claimed in claim 1 wherein said plurality of windows comprises at least two windows and said plurality of fingers comprises at least two fingers.

5. Apparatus as claimed in claim 1 wherein said plurality of windows comprises four windows and said plurality of fingers comprises four fingers.

6. Apparatus as claimed in claim 3 wherein transmission of torque from said drive plate to said driven plates compresses said resilient means and moves said fingers in said windows so that said first and second gaps are not of equal width, said sensor output signal including first and second signals having durations corresponding to the widths of said first and second gaps, respectively, and means responsive to said first and second electrical signals for producing an indication of the torque transmitted through said damper.

7. Apparatus as claimed in claim 6 and further comprising means responsive to said sensor output signal for producing an indication of the rate of rotation of said input shaft.

8. Apparatus as claimed in claim 7 wherein said means for producing an indication of the torque transmitted and said means for producing an indication of the rate of rotation of said input shaft comprise a microcomputer.

9. Apparatus for measuring the torque transmitted from a rotating input shaft to a rotating output shaft, said apparatus comprising:

a sensor;

a first element mounted for rotation with said input shaft in a plane normal to the axis of rotation of said input shaft, said first element having a plurality of arcuate segments spaced apart to define a plurality of windows, said arcuate segments being located on said first element so as to be sensed by said sensor as said input shaft rotates;

a second element fixed to said output shaft, said second element having a plurality of fingers with each finger extending into one of said windows so that said fingers may be sensed by said sensor as said second element is rotated;

said windows being wider than said fingers so that a gap exists between each finger and adjacent ones of said arcuate segments;

resilient means disposed between said first and second elements for transmitting torque from said first element to said second element while permitting limited rotational movement between said first and second elements;

said sensor comprising means for producing an output signal having a first level and a second level, said output signal making a transition from said first level to said second level when one of said arcuate segments or fingers is sensed and a transition from said second level to said first level upon sensing one of said gaps;

means responsive to said output signal for producing an indication of the torque transmitted to said output shaft; and, means responsive to said sensor output signal for producing an indication of the rotational velocity of said input shaft.

10. Apparatus as claimed in claim 9 for use in a vehicle having an engine driving a transmission through a damper, said input shaft being a crankshaft of said engine, said output shaft being a drive shaft for driving said transmission, and said second element and said resilient means comprising a damper.

11. Apparatus as claimed in claim 9 wherein said means for producing an indication of torque comprises a microcomputer.

12. Apparatus as claimed in claim 11 wherein said fingers are shorter than said arcuate segments and said microcomputer comprises means for distinguishing between transitions occurring upon sensing a finger and transitions occurring upon sensing an arcuate segment by comparing the duration of said signal at said first level following consecutive transitions of said signal to said first level.

13. Apparatus as claimed in claim 12 wherein said microcomputer includes means for producing a first value representing a first interval of time elapsing between two consecutive transitions of said signal to said first level caused by sensing of arcuate segments.

14. Apparatus as claimed in claim 13 wherein said microcomputer includes means for deriving from said first value an indication of the rotational velocity of said input shaft.

15. Apparatus as claimed in claim 13 wherein said microcomputer includes means for producing a second value representing a second interval of time elapsing between the first of said two consecutive transitions and the next transition to said first level following said first of said two consecutive transitions, said microcomputer also including means for deriving from said first value and said second value a third value indicative of the instantaneous torque transmitted to said output shaft.

16. Apparatus as claimed in claim 15 wherein said microcomputer includes means for accumulating a plurality of said third values as said shafts rotates, means for averaging said third values to obtain an average value, and means for deriving from said average value a further value representing the average torque transmitted to said output shaft.

17. Apparatus as claimed in claim 16 wherein said microcomputer includes means for accumulating a plurality of said first values over an interval of time, and means for averaging said first values to produce a value representing the average rotational velocity of said input shaft.

18. Apparatus as claimed in claim 17 for use in a vehicle having an engine driving a transmission through a damper, said input shaft being a crankshaft of said engine and said output shaft being a drive shaft for driving said transmission, said value representing the average torque transmitted to said output shaft being used by said microcomputer to control at least one of a group of components comprising said engine and said transmission.

19. Apparatus for measuring both the torque transmitted from a rotating input shaft to a rotating output shaft and the speed of said input shaft, said apparatus comprising:

a first element driven by said input shaft and having a peripheral surface portion comprising a plurality of arcuate segments spaced from each other to form a plurality of windows;

a damper comprising a drive element affixed to said first element, a driven element affixed to said output shaft, and a resilient means disposed between said drive element and said driven element for driving said driven element in response to rotation of said drive element;

said driven element having a plurality of fingers extending into said windows;

a single sensor disposed adjacent said first element for sensing passage of said arcuate segments and said fingers and producing an output signal; and, a microcomputer responsive only to said output signal for determining both the average torque transmitted through said damper and the rate of rotation of said input shaft.

20. Apparatus as claimed in claim 19 wherein said microcomputer is responsive to said sensor output signal for generating indications of the transmitted torque and the rate of rotation of said input shaft even while said input shaft rotates at a constant speed.

21. Apparatus as claimed in claim 19 wherein said resilient means comprises a plurality of springs, said drive element comprises a drive plate, and said driven element comprises first and second driven plates disposed on opposite sides of said drive plate, said drive plate and said driven plates having a plurality of openings therein in which said resilient means are disposed, said resilient means being compressed by said drive plate and said driven plates so as to tend to align the openings in said driven plates with the openings in said drive plate.

22. Apparatus as claimed in claim 21 wherein said resilient means comprises at least one spring having a first spring modulus and at least one spring having a second spring modulus greater than said first spring modulus.

* * * * *